(12) United States Patent
Matveev

(10) Patent No.: US 11,499,458 B2
(45) Date of Patent: Nov. 15, 2022

(54) SYSTEMS FOR AN ICE GUIDING DEVICE OF A TANK

(71) Applicant: Ford Global Technologies, LLC, Dearborn, MI (US)

(72) Inventor: Timofey Matveev, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 21 days.

(21) Appl. No.: 17/024,235

(22) Filed: Sep. 17, 2020

(65) Prior Publication Data

US 2021/0087961 A1    Mar. 25, 2021

(30) Foreign Application Priority Data

Sep. 19, 2019 (DE) .......................... 102019214253.2

(51) Int. Cl.
*F01N 3/20* (2006.01)
*B60K 13/04* (2006.01)

(52) U.S. Cl.
CPC ............ *F01N 3/2066* (2013.01); *B60K 13/04* (2013.01); *F01N 2610/02* (2013.01); *F01N 2610/1406* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,013,728 B2 * | 3/2006 | Okada | ..................... | G01F 23/36 116/227 |
| 9,784,158 B2 * | 10/2017 | Maguin | ................. | F01N 3/2066 |
| 9,840,958 B2 * | 12/2017 | Maus | ..................... | F01N 3/2066 |
| 10,023,048 B2 | 7/2018 | Ganthaler et al. | | |
| 2006/0213473 A1 * | 9/2006 | Theorell | ............... | F01N 3/2066 123/142.5 R |
| 2009/0038296 A1 * | 2/2009 | Fukuda | ................ | B60K 15/035 60/295 |
| 2011/0232271 A1 * | 9/2011 | Haeberer | ............... | B60K 13/04 60/295 |
| 2012/0055568 A1 * | 3/2012 | Friedel | .................. | F01N 3/2066 137/565.17 |
| 2015/0198071 A1 * | 7/2015 | Hudgens | ............ | B01D 35/0276 210/805 |
| 2015/0329242 A1 * | 11/2015 | Miyamoto | ........... | B60K 15/063 248/313 |
| 2017/0328255 A1 | 11/2017 | Maguin | | |

FOREIGN PATENT DOCUMENTS

| | | |
|---|---|---|
| DE | 102009036260 A1 | 2/2011 |
| DE | 102012108273 A1 | 3/2014 |
| DE | 102015204621 A1 | 9/2016 |
| WO | 2010069636 A1 | 6/2010 |
| WO | 2010072436 A1 | 7/2010 |

OTHER PUBLICATIONS

Lee, S. et al., "Numerical Investigation of Urea Freezing and Melting Characteristics Using Coolant Heater," Transactions of The Korean Society of Mechanical Engineers, vol. 37, No. 8, Jul. 5, 2013, 8 pages.

* cited by examiner

*Primary Examiner* — Binh Q Tran
(74) *Attorney, Agent, or Firm* — Vincent Mastrogiacomo; McCoy Russell LLP

(57) ABSTRACT

Methods and systems are provided for a fluid tank. In one example, the fluid tank comprises an ice guiding device extending into an interior volume of the fluid tank, wherein the ice guiding device extends past a fill limit line of the interior volume.

18 Claims, 8 Drawing Sheets

SYSTEMS FOR AN ICE GUIDING DEVICE OF A TANK

CROSS REFERENCE TO RELATED APPLICATIONS

The present application claims priority to German Patent Application No. 102019214253.2 filed on Sep. 19, 2019. The entire contents of the above-listed application is hereby incorporated by reference for all purposes.

FIELD

The present description relates generally to a tank suitable for accommodating fluid operating media of a motor vehicle having an icing guide device

BACKGROUND/SUMMARY

Devices for protection against icing may relate to a tank for a fluid operating medium in a motor vehicle, for example tanks for urea-water solution (trade name Adblue®), DEF or water (for example cleaning liquid of a windshield or headlight washer systems). Although such operating media may have an antifrost agent as protection against freezing, in the event of outside temperatures of for example between −10° and −30° being sustained over a long period of time, freezing of the fluid operating media, that is to say icing, may occur.

The volume expansion during the icing process may be withstood or compensated by tanks having liquid operating media with a high freezing point of the liquid. The tank may therefore not be filled completely with the operating medium. Rather, a compensation volume remains at all times as a free space or compensation space for compensating for volume expansion during icing.

In the event of the liquid freezing, a first ice layer is formed first of all on the outer edges of the tank interior and on the surface, directed toward the compensation volume, of the operating medium. Over time, the ice layer may grow toward the interior of the tank. At the same time, the ice layer bulges during the growth, the formation of a so-called "ice volcano" possibly occurring. This bulging of the additional ice volume may deform the entire tank. The tank outer wall can accommodate the deformation generally only plastically and is consequently degraded.

Therefore, it may be desired to maintain a spacing between the surface of the liquid and the bottom side of the upper wall of the tank at least in the region in which the ice volcano is expected to be formed. This location is typically arranged centrally on the surface of the liquid. Such a compensation space undesirably limits the volume of the liquid, which volume is limited anyway by the complex tank geometries which are desired due to the available space in the motor vehicle. The SCR tank, for example, loses approximately 3 liters of volume usable for the liquid.

As an alternative to a compensation space, the icing process is controlled by the configuration of insulation of the tank surface. In this way, more cold is introduced in specific regions of the tank than in other regions. In this regard, EP 2 376 751 B1, for example, discloses a hood-like insulation on the top side of a tank, while the tank base remains free of insulation. Consequently, although icing is not prevented, the manner of the volume expansion during icing is influenced in a targeted manner. However, such insulation would also take up space, and entail costs due to additional outlay in terms of material and parts.

Furthermore, the icing process may be controlled in such a way that the enclosure of liquid by ice, a so-called "cavity", is prevented. Various possibilities for controlled icing of tanks and for protection of fixtures are shown in previous examples.

DE 10 2015 204 621 A1 relates to a tank for a liquid operating medium of a motor vehicle that has an immersion tube which is arranged in the region of the ice compensation volume. For protection against damage to the immersion tube in the event of icing of the operating medium, the immersion tube is at least partially elastically deformable.

U.S. Pat. No. 10,023,048 B2 proposes controlled icing, in that the individual wall portions of the tank wall are formed with different insulation action, that is to say with different wall thicknesses or wall materials. The compensation space provided is furthermore reduced in that the distance between the surface of the liquid and the upper tank wall is maintained only locally and in particularly susceptible regions.

US 2017/0328255 A1 discloses a tank apparatus for an aqueous urea solution that has a separate base portion which is fitted on the tank housing. A lamellar structure is formed on a top side of the separate base portion. In the event of the urea solution freezing, the lamellar structure produces predetermined breaking points, which prevent the formation of a cavity.

WO 2010/069636 A1 presents a tank having an ice pressure element which, inter alia by way of its compressibility, guides into free spaces in the tank reducing agent which has not yet frozen, in order to prevent cavities. The ice pressure elements are of rod-like form and extend through the tank substantially in a vertical direction.

In view of the previous examples presented, controlled icing of a tank with a fluid operating medium still has potential for improvements. The present disclosure is based on the object of avoiding degradation to the tank, and to the vehicle, as a result of icing of the fluid operating medium. It is furthermore the object to maximize the quantity of operating medium that is able to be introduced into the tank interior provided by the tank.

In one example, the issues described above may be addressed by a system comprising a reservoir tank comprising a protrusion extending from an upper tank wall past a fill limit line, wherein the protrusion is in contact with a fluid in the reservoir tank. In this way, formation of a liquid bubble as the liquid freezes may be avoided.

As one example, the protrusion guides ice formation of the liquid in the reservoir tank. In one example, the protrusion is hollow and increases a surface area in which ambient air may thermally communicate with fluid in the reservoir tank. In another example, the protrusion may be filled with an insulating material, wherein ice formation is pushed to areas of the reservoir tank with more space than a center at of the tank, at which the protrusion may be arranged.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 1 to 9d are shown approximately to scale.

DETAILED DESCRIPTION

Figure 1:
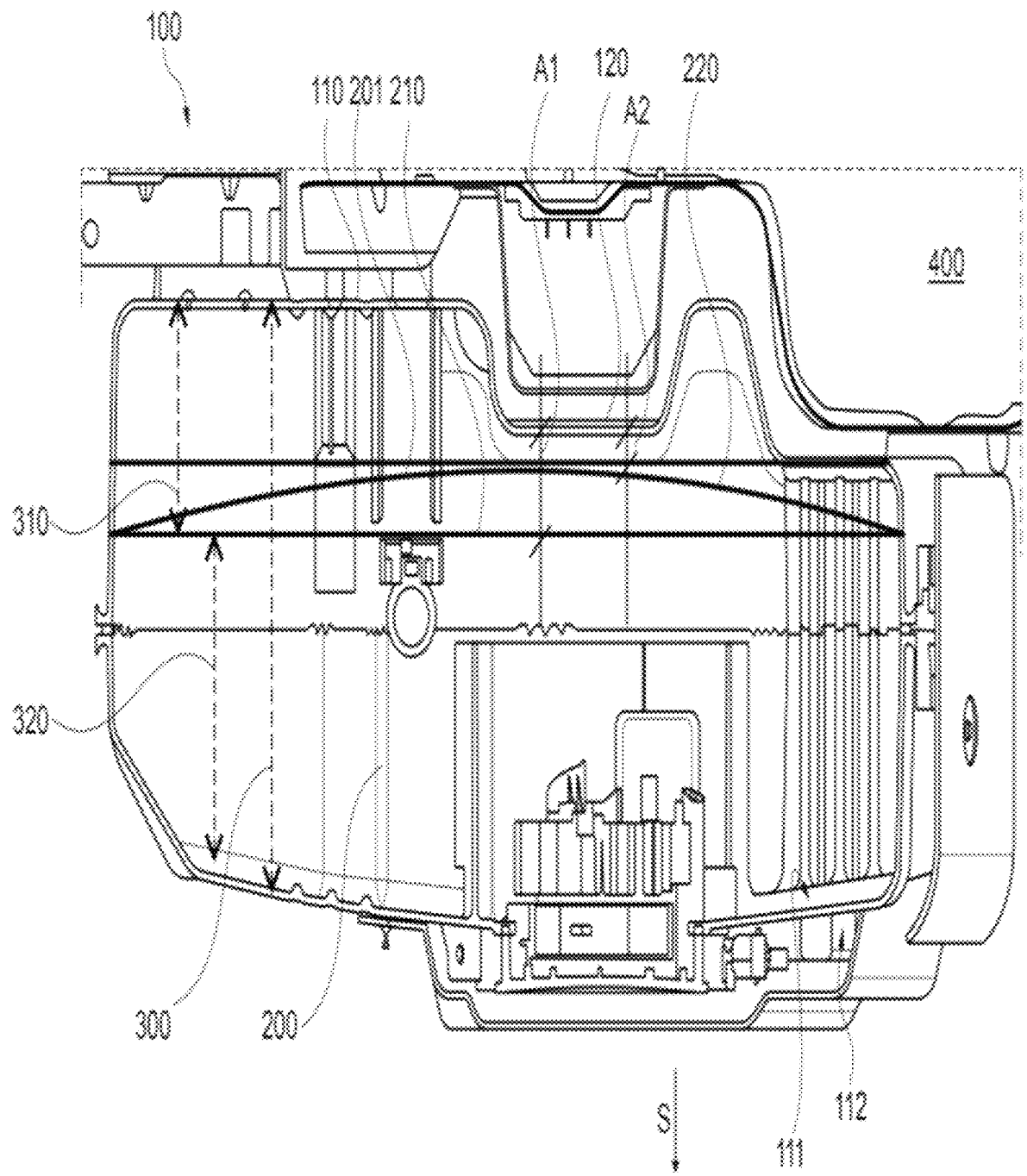
FIG. 1 shows a sectional illustration of an exemplary tank from a previous example.
Figure 2:
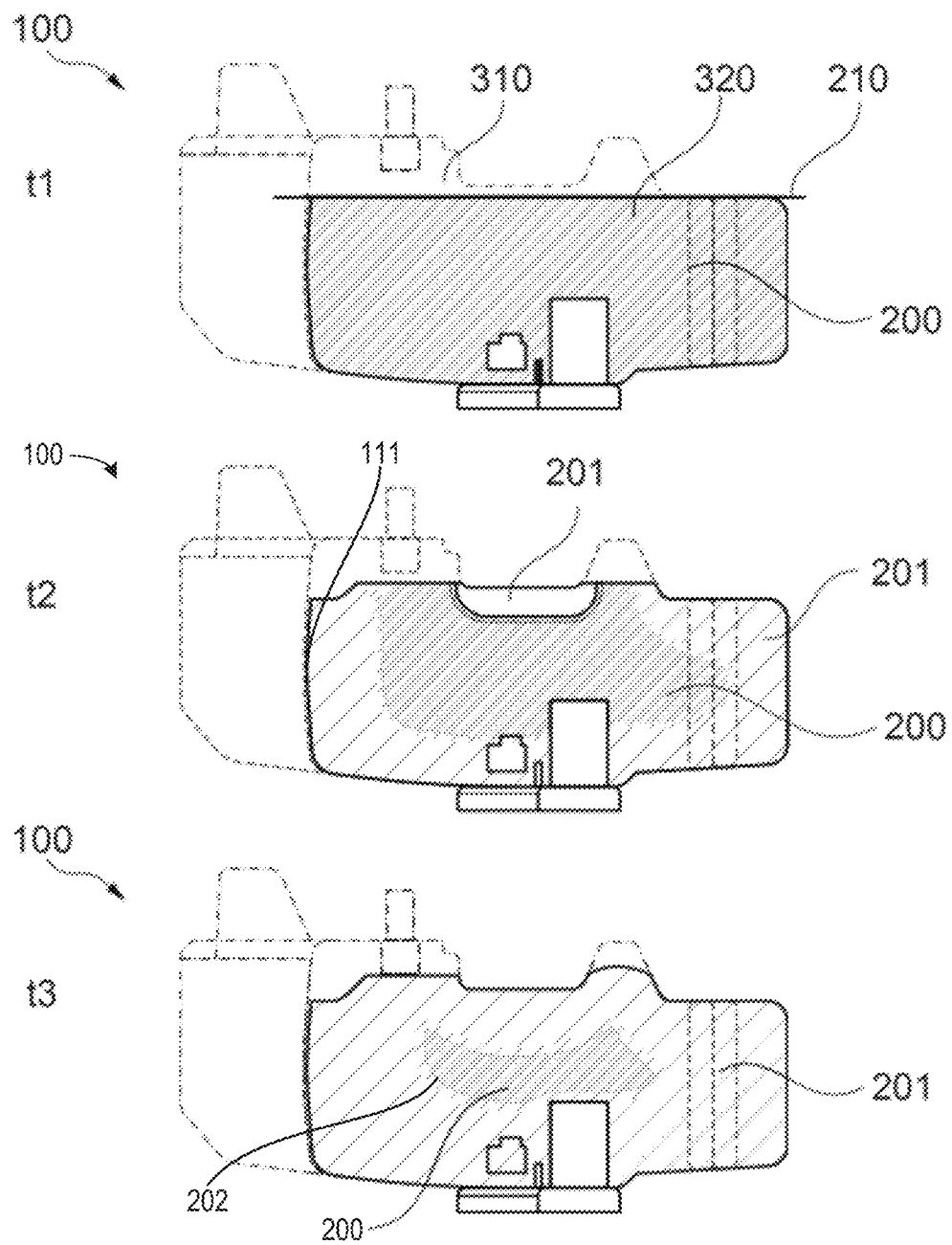
FIG. 2 shows an exemplary icing process with a tank from the previous example.
Figure 3A:
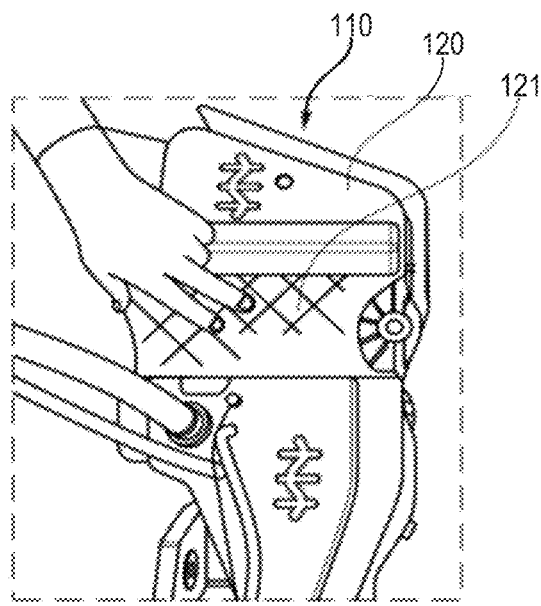
FIGS. 3a-3d show example test results with a tank from the previous example.
Figure 3B:
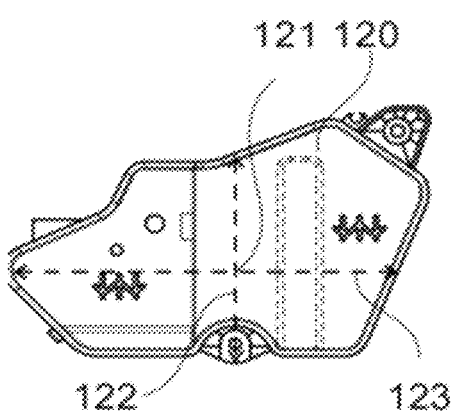
Figure 3C:
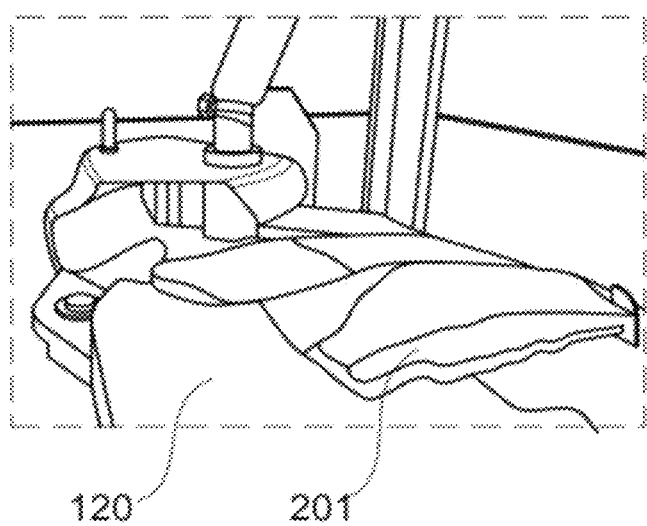
Figure 3D:
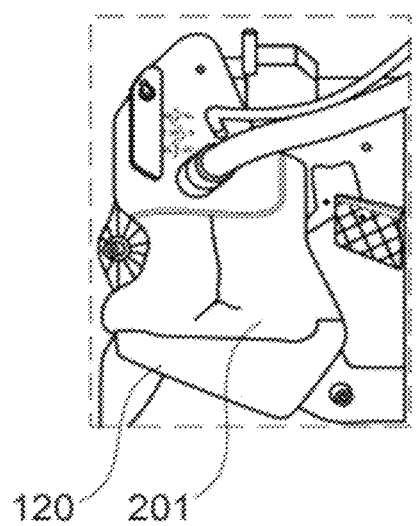
Figure 4A:
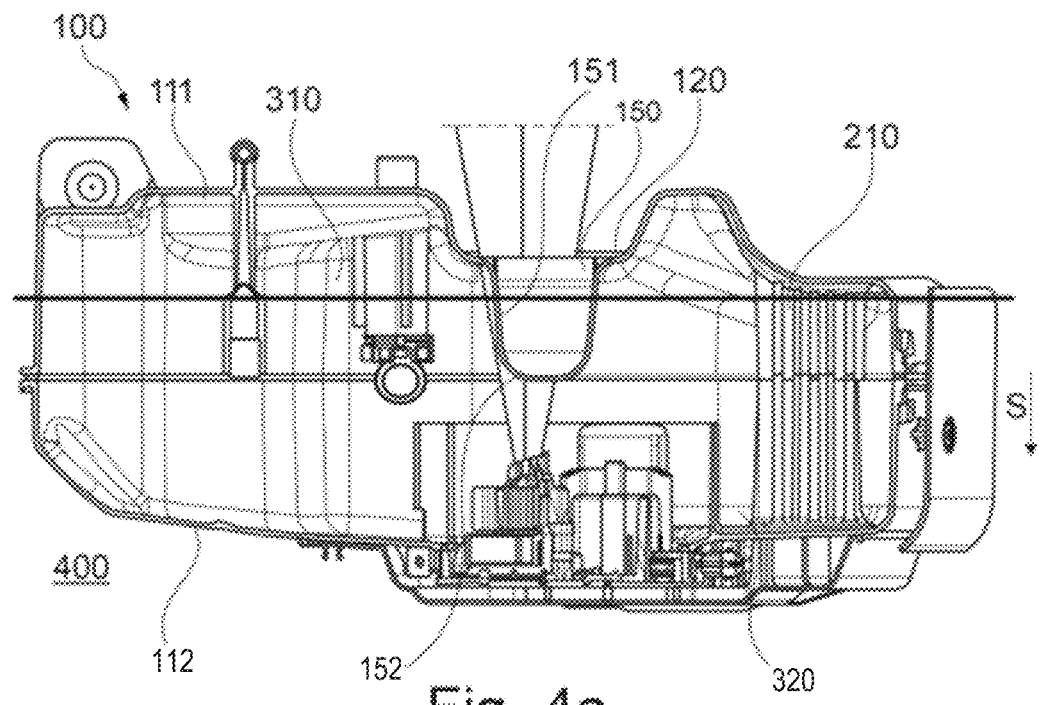
FIGS. 4a-4b show sectional illustrations of an exemplary embodiment of a tank according to the disclosure.
Figure 4B:
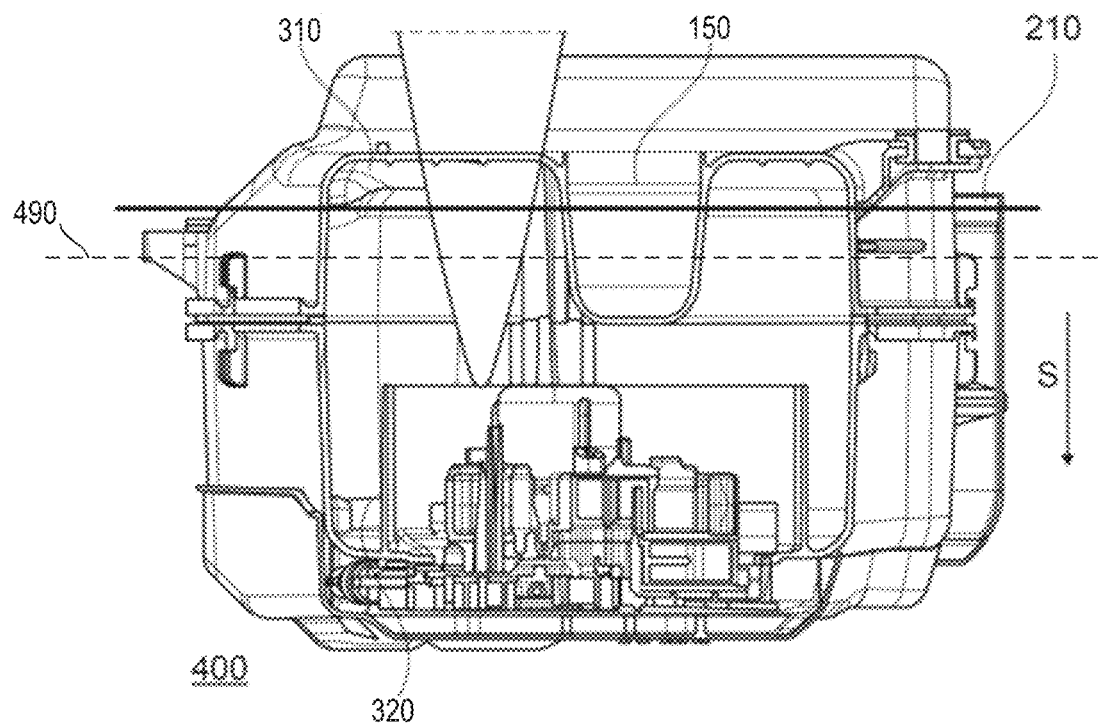
Figure 5:
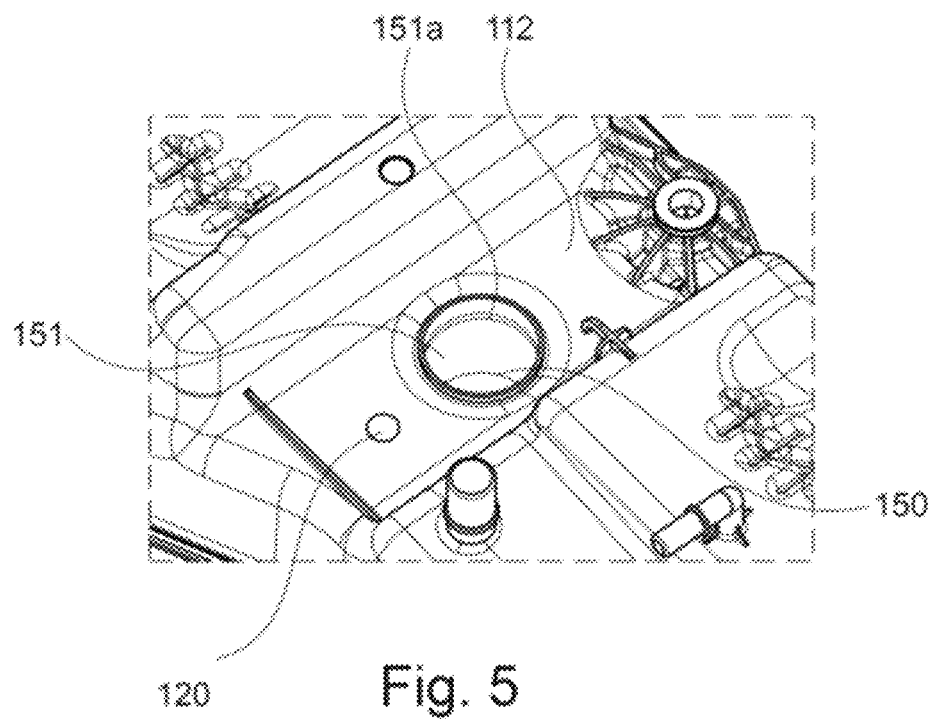
FIG. 5 shows an enlarged detail of a perspective view of the outer tank outer side of an exemplary tank according to the disclosure.
Figures 6A, 6B:
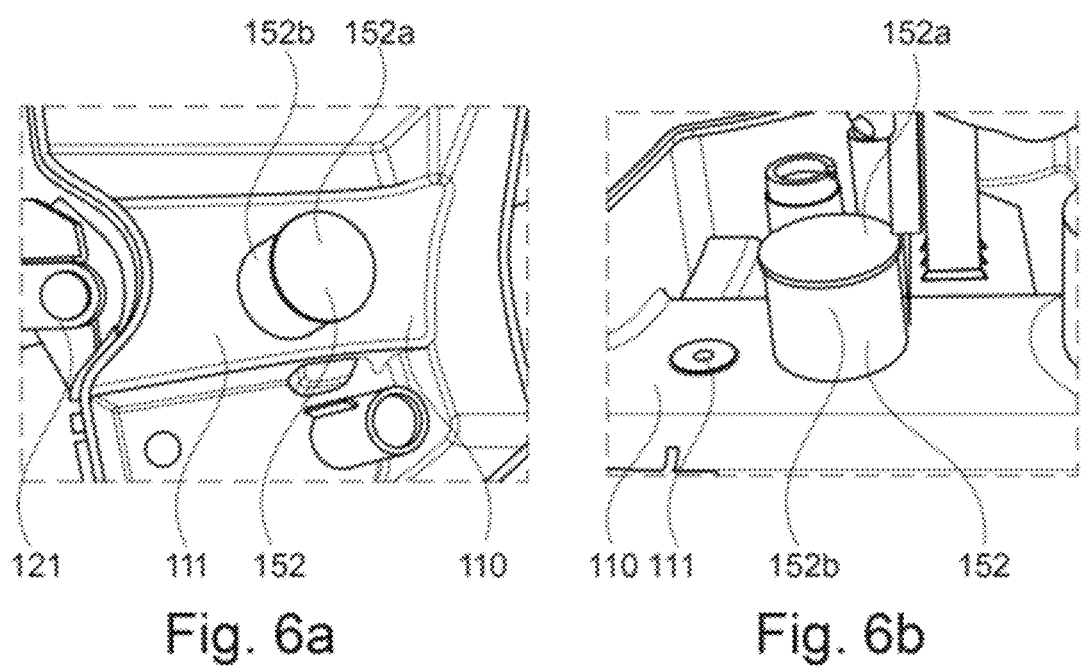
FIGS. 6a-6b show an enlarged detail of a perspective view of the outer tank inner side of an exemplary tank according to the disclosure.
Figure 7:
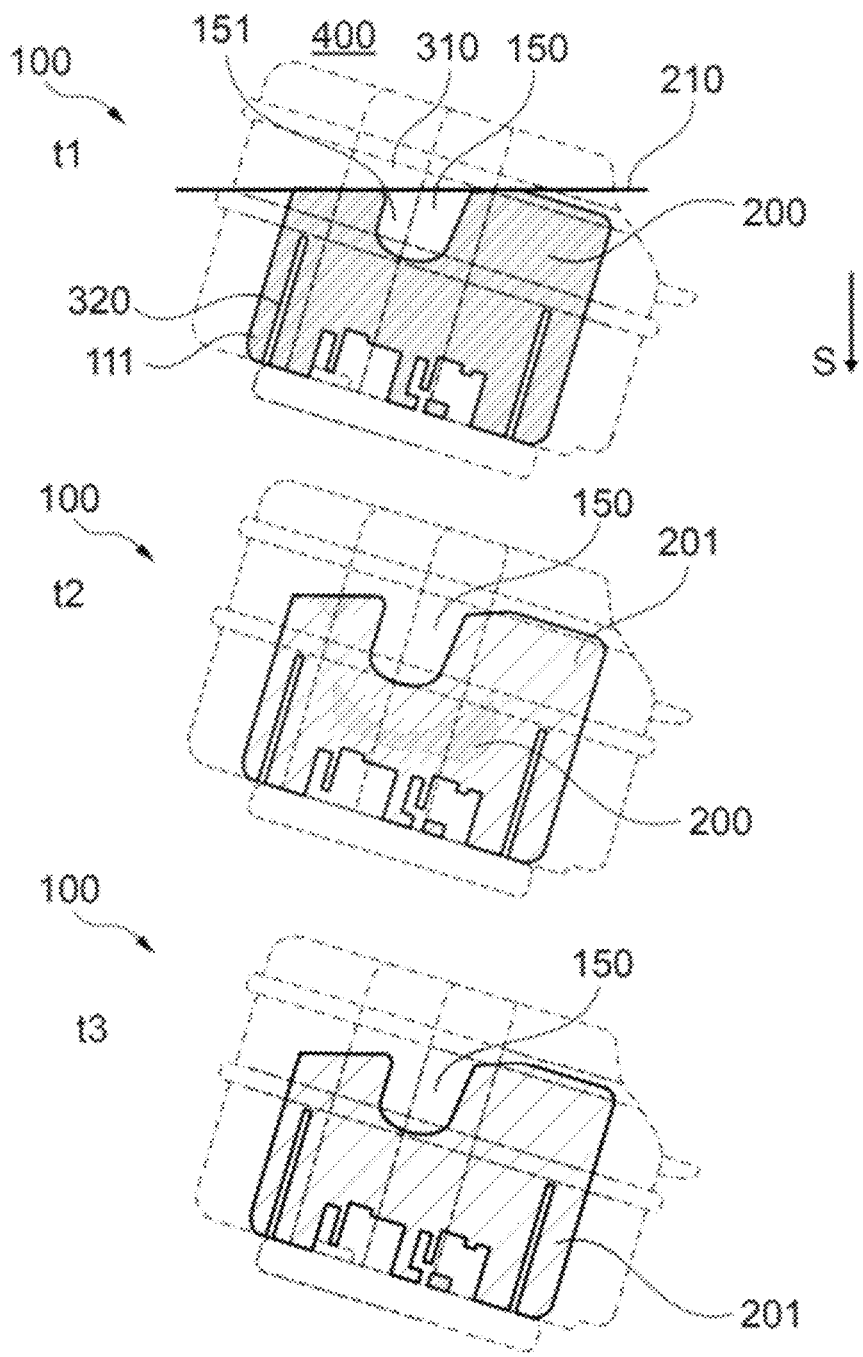
FIG. 7 shows an exemplary icing process with a tank of an exemplary embodiment of a tank according to the disclosure.
Figures 8A, 8B:
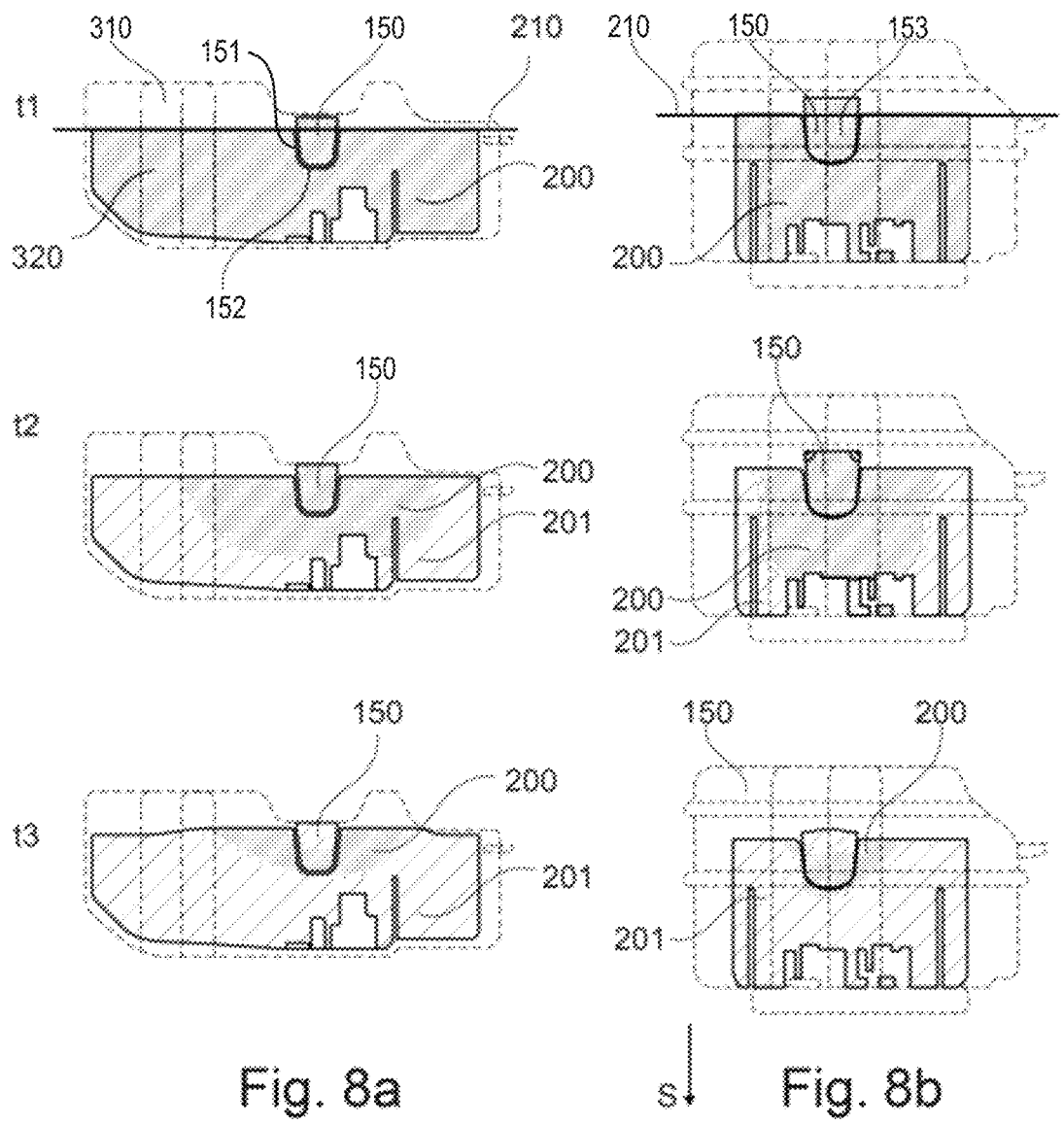
FIGS. 8a-8b show an exemplary icing process with a tank of an exemplary embodiment of a tank according to the disclosure having an insulated icing guide device.
Figure 9A:
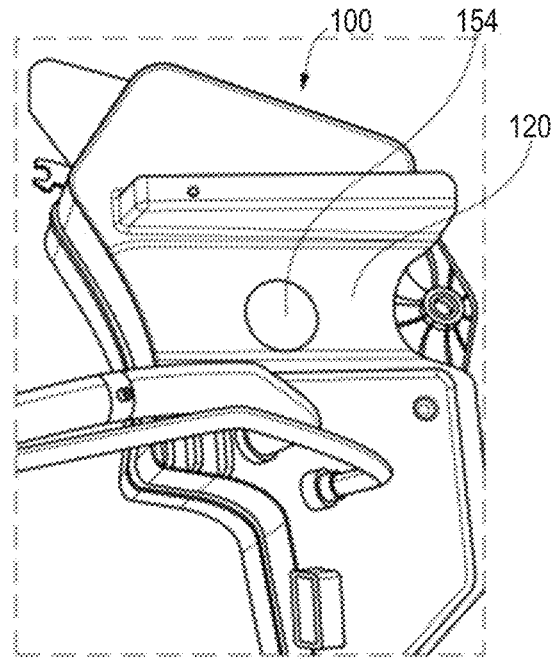
FIGS. 9a-9d show exemplary test results with an exemplary embodiment of a tank according to the disclosure.
Figure 9B:
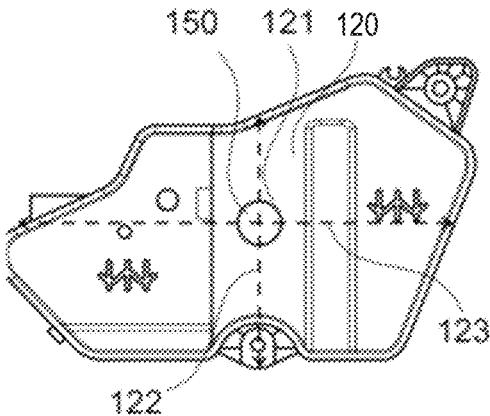
Figure 9C:
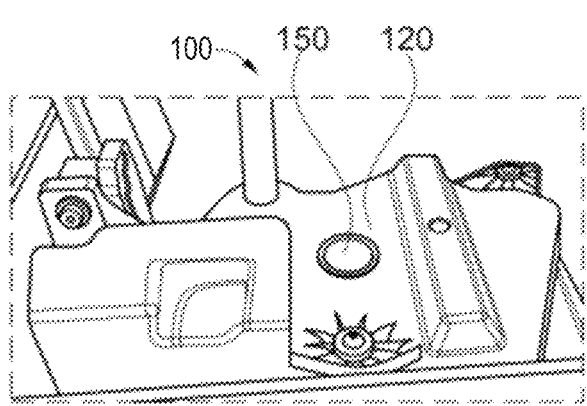
Figure 9D:
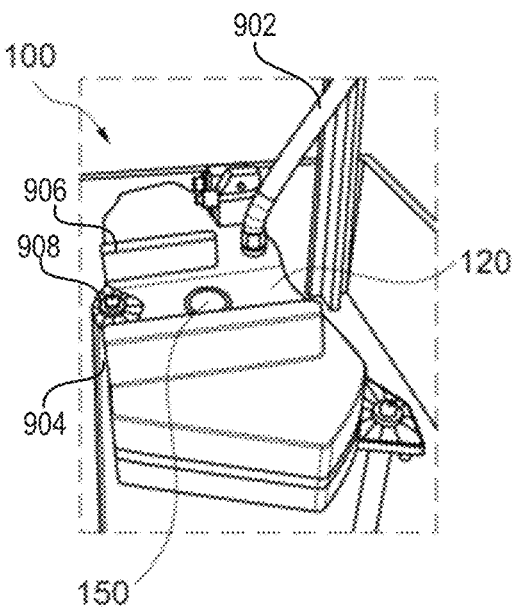

The following description relates to systems for an ice guiding device. FIG. 1 shows a sectional illustration of an exemplary tank from a previous example. FIG. 2 shows an exemplary icing process with a tank from the previous example. FIGS. 3a-3d show example test results with a tank from the previous example. FIGS. 4a-4b show sectional illustrations of an exemplary embodiment of a tank according to the disclosure. FIG. 5 shows an enlarged detail of a perspective view of the outer tank outer side of an exemplary tank according to the disclosure. FIGS. 6a-6b show an enlarged detail of a perspective view of the outer tank inner side of an exemplary tank according to the disclosure. FIG. 7 shows an exemplary icing process with a tank of an exemplary embodiment of a tank according to the disclosure. FIGS. 8a-8b show an exemplary icing process with a tank of an exemplary embodiment of a tank according to the disclosure having an insulated icing guide device. FIGS. 9a-9d show exemplary test results with an exemplary embodiment of a tank according to the disclosure.

The disclosure relates to a tank suitable for accommodating fluid operating media of a motor vehicle. The tank has an outer tank with an outer tank inner side and an outer tank outer side, wherein the outer tank encloses a tank interior, which tank interior is able to be subdivided into an operating-medium volume and a compensation volume. In this case, an icing guide device is arranged on the outer tank, which icing guide device is in the form of at least one depression, pointing into the tank interior, of the outer tank outer side.

In accordance with the solution proposed according to the disclosure, the icing of the fluid operating medium is influenced in a targeted manner and degradation to the tank through the formation of ice is avoided. Here, during the icing of the fluid operating medium, air streams of the cold ambient air on the outer tank outer side and/or flows of the fluid operating medium in the tank interior are guided such that the process of the icing is altered. The at least one depression, pointing inwardly or into the tank interior, of the outer tank outer side locally enlarges the contact surface between the operating medium and the outer tank inner side. Due to the enlarged contact surface in the region of the depression, cold ambient air can initiate the formation of an ice layer there. In other words, additional ambient cold is provided for the fluid operating medium in order to influence the icing or the ice formation of the operating medium. Alternatively or additionally, fluid operating medium is displaced locally along the locally enlarged outer tank inner side for this purpose. The icing guide device can then cause the critical regions to freeze first of all and the ice layer to expand at those places where sufficient space is available and there is reduced risk of degradation to the tank.

The ice formation in the fluid operating medium is thus influenced in such a way that, during the volume expansion of the ice layer in the event of freezing, an undesired pressure build-up or an undesired pressure discharge by way of ice volcanoes or cavities may not arise in the first place. For an unchanging tank interior, the desired compensation volume may be smaller and the operating-medium volume can be larger. Preferably, the compensation volume can be reduced to the minimum size demanded for compensating for the volume expansion of the ice layer. "Operating-medium volume" is defined as the volume of the maximum introducible quantity of fluid or liquid operating medium. An exemplary embodiment according to the disclosure consequently has a depression in the tank outer wall that are not dependent on the stability or stiffness of the tank or the available space for the installation of the tank.

In an exemplary embodiment of the disclosure, additionally or alternatively, the icing guide device is in the form of at least one projection of the outer tank inner side. Such a projection on the outer tank inner side can result directly from the at least one depression on the outer tank outer side. Such a projection results in the fluid operating medium being locally displaced. Consequently, no ice layer can be formed at the location of the displaced operating medium. Rather, the ice layer grows in the tank interior at those places where the volume expansion of the ice layer can be tolerated.

In one example, the icing guide device is arranged entirely or partly in the region of the operating-medium volume. That is to say, the icing guide device is immersed at least partly in the operating medium at least for a maximum permissible filling of the tank with fluid operating medium, with maximum utilization of the operating-medium volume provided. If, during operation, the volume of the fluid operating medium decreases due to consumption, with the surface of the fluid operating medium also lowering, the icing guide device can lose contact with the fluid operating medium. With decreasing fill quantity, the icing guide device can finally be rendered superfluous because the volume expansion of the ice layer is inevitably smaller and there is more compensation space available for the expansion of the ice layer of the remaining fluid operating medium. In other words, at least for a maximum filling, the icing guide device is at all times in direct contact with the fluid operating medium.

In an optional embodiment of the disclosure, the outer tank has an upper wall with respect to the vehicle vertical axis, wherein the icing guide device is arranged on the upper wall.

Due to the direction of gravitational force, the compensation volume may be arranged above a surface of the operating-medium volume. The vehicle vertical axis is oriented parallel to the direction of gravitational force. The compensation space is normally filled with air or gaseous or evaporated operating medium and thermally insulates the fluid operating medium toward the top. The icing guide device bridges the insulation in the compensation space and is immersed in the operating medium. Consequently, the fluid operating medium, despite the compensation space, has direct contact with the tank outer wall, and thus with the ambient cold, in the region of the icing guide device. Ambient cold can consequently also be transported centrally to the surface of the operating medium. Put differently, cold from the ambient air can be provided in the tank interior at a location in the operating medium where, without the icing guide device, there would be no contact to the outer wall of the tank.

The depression of the outer tank outer side may optionally be filled or able to be filled with an insulating material. Thus, although the cold flow can be reduced in the region of the locally enlarged surface, the local displacement of fluid operating medium is maintained. The insulation may be realized in that the depression of the icing guide device is filled completely or partly with the material of the outer tank. Impurities which can pass into the depression during the operation of the tank in a motor vehicle (for example sand, water, snow) have a similar insulating effect in the icing guide device. Consequently, the icing guide device remains functional during operation, for example during operation of a motor vehicle, despite possible impurities.

In an optional refinement of the disclosure, the icing guide device is in the form of a pocket in the outer tank outer side that has a cylindrical, in particular circular-cylindrical, profile.

Here, a first end surface of the cylindrical profile forms the opening of the depression and the second end surface forms the base surface. For a maximum filling of the operating-medium volume with fluid operating medium, in particular the base surface is at all times in contact with the fluid operating medium. The lower part of the lateral surface of the cylindrical pocket with respect to the vehicle vertical axis is also at all times in contact with the fluid operating medium for a maximum filling of the operating-medium volume with fluid operating medium. Such a profile can be formed, and integrated into the wall of the outer tank, in a particularly inexpensive manner. The integration may be realized in that the pocket is formed in one piece with the wall of the outer tank during the production of the tank. Alternatively, the pocket may, at a later stage, as a separate insert, be inserted into the wall of the outer tank and connected sealingly to said wall. The icing guide device may however also have complex, for example finger-like, geometries.

In the different figures, identical parts are always provided with the same reference signs, for which reason these parts are generally also described only once. For the purpose of clarity, a liquid operating medium or an operating liquid is, for simplicity, normally taken as a basis in the following text, even if all fluid operating media, that is to say having liquid, gaseous or solid or solid constituents, are covered by the wording.

FIG. 1 shows a tank 100 of a previous example for a liquid operating medium 200, for example an SCR tank, of a motor vehicle in its orientation during operation relative to gravitational force S. The tank 100 comprises an outer tank 110, illustrated in cut-open form, which may be of a one-part or multi-part design and has an outer tank inner side 111 and an outer tank outer side 112. The geometry of the outer tank 110 substantially arises from the available space during installation and the desired volume of operating medium 200. The outer tank 110 encloses a tank interior 300. The tank interior 300 is partly filled with a fluid operating medium 200, so that an operating-medium volume 320 is formed in a lower region and a compensation volume 310 remains in an upper region. A surface 210 of the operating medium 200 is formed below the compensation volume 310 and above the operating-medium volume 320. The operating-medium volume 320 and the compensation volume 310 substantially add up to the tank interior 300. In the event of the operating medium 200 freezing, a first ice layer 201 is formed first of all on the outer edges and on the surface 210, directed toward the compensation volume 310, of the operating medium 200 (cf. FIG. 2). Over time, said ice layer 201 grows toward the center of the tank 100. At the same time, the ice layer 201 bulges during the growth so as to form an ice volcano 220. This bulging of the additional ice volume can deform the entire outer tank 110. The compensation volume 310 must therefore be dimensioned to be sufficiently large in that a distance A1 of for example 35 mm remains between the surface 210 and an upper wall 120 of the outer tank 110, so that, even after the ice volcano 220 has formed, a distance A2 between the ice layer 201 and the upper wall 120 of for example 10 mm still remains. Consequently, it is therefore desired, for example, that 18% of the tank interior 300 to be sacrificed without use for the compensation volume 310.

FIG. 2 shows an exemplary freezing process for the operating medium 200 in a tank 100 with a maximally filled operating-medium volume 320 from the prior art at three selected times t1-t3. At a first time t1, the operating medium 200 is still liquid. If the operating medium 200 in the tank 100 freezes at the time t2, then first of all an ice layer 201 is formed on the outer tank inner sides 111 of the outer tank 110. At the same time, the operating-medium surface 220 freezes. At the time t3, a liquid operating-medium volume 200 is enclosed in the interior in a liquid bubble 202 and a cavity is formed. If the enclosed liquid bubble 202 finally also freezes, there is no space left for volume expansion due to the enclosure by the ice layer 201. Breakup of the ice layer 201 may finally occur, this generally propagating in the direction of the upper wall 220 of the outer tank 110. This can degrade the tank 100, which may include the tank 100 rupturing and leaking the operating medium.

Such degradation of the outer tank 110 is shown in FIGS. 3a-3d. First of all, as per FIG. 3a, a deformation 121 of the upper wall 120 can arise due to the formation of an ice volcano 220 (cf. FIG. 1), which, with increasing growth of the ice layer 201, pushes against the upper wall 120 from below. A tank 100 with a tank interior 300 or an operating-medium volume 320 of 16 liters would then, for example as per FIG. 3b, be subjected to a deformation 121 in the form of a bulging of the upper wall 120 amounting to 1.13 millimeters. The deformation 121 is typically most pronounced at the center with respect to a tank width 123 and a tank depth 122. As a result of the deformation 121, the upper wall 120, as per FIGS. 3c-3d, can break open and expose the ice layer 201. Without an icing guide device (such as icing guide device 150 of FIGS. 4a and 4b), such a tank 100 may degrade in the event of complete icing.

FIGS. 4a and 4b show two views of the same tank 100 for a liquid operating medium 200 of a motor vehicle with a cut-open outer tank 110. By contrast to the tank 100 as per FIG. 1, an icing guide device 150 is provided. The icing guide device 150 is in the form of a depression 151, pointing into the tank interior 300, of the outer tank outer side 112 and at the same time in the form of a projection 152 of the outer tank inner side 111. The icing guide device 150 is arranged partly in the region of the compensation volume 310 and partly in the region of the operating-medium volume 320 in a manner pointing downward from the upper wall 120. The proportion of the icing guide device 150 covered by liquid operating medium 200 is dependent on the actual fill level of the operating-medium volume 320. Due to the immersion of the icing guide device 150 in the operating medium 200, the depression 151 allows a direct exchange of temperature with the surroundings 400 at the center of the tank interior 300. Consequently, the operating medium 200, despite the compensation space 310, has direct contact with the outer tank inner side 111, and thus with the ambient cold, in the region of the icing guide device 150. Ambient cold may in this way be transported to the surface 210 of the operating medium 200. As a result of the icing guide device 150, it is possible to reduce the size of the compensation volume 310 and therefore to increase the size of the operating-medium volume 320, for example to 85% of the tank interior 300. This is true even in consideration of the fact that the icing guide device 150 takes up space in the tank interior 300.

In one example, the icing guide device 150 shapes a volume into which the surroundings 400 may further extend toward the interior volume of the tank 100. That is to say, the surface 210 is extended toward the interior volume of the tank 100 via the icing guide device 150, thereby increasing a surface area in which the surroundings 400 may thermally communicate with the interior contents of the tank 100.

A fill limit line 490 of the tank 100 is illustrated. The icing guide device 150 extends beyond the fill limit line 490 such that the protrusion 152 is below the fill limit line. In one example, the protrusion 152 extends to a center of the interior volume of the tank.

FIG. 5 shows an enlarged detail of the outer tank outer side 112 of the upper wall 120 of the outer tank 110 with the depression 151 of the icing guide device 150. The icing guide device 150 is for example in the form of a pocket in the outer tank outer side 112 that has a circular-cylindrical profile, wherein a first end surface 151a of the cylindrical profile constitutes the opening of the depression 151 with respect to the surroundings 400. The integration of the icing guide device 150 may be realized in one piece with the upper wall 120 of the tank 100. Alternatively, the depression 151, as a separate insert, may, at a later stage, be inserted into the upper wall 120 of the outer tank 110 and connected sealingly to said upper wall. As illustrated, the first end surface 151a is in direct contact with the surroundings.

FIGS. 6a and 6b show an enlarged detail of the outer tank inner side 111 of the upper wall 120 of the outer tank 110 with the projection 152 of the icing guide device 150. The projection 152 of the icing guide device 150 on the outer tank inner side 111 may correspond to the pocket in the outer tank outer side 112, wherein a second end surface 152a of the cylindrical profile forms the base wall of the icing guide device 150. For a maximum filling of the operating-medium volume 320 with operating medium 200, in particular the base wall is at all times below the surface 210 of the operating medium 200. The lower part of the lateral surface 152b of the cylindrical icing guide device 150 is also immersed at all times for a maximum filling of the operating-medium volume 320 with operating medium 200. Such an icing guide device 150 can be formed in a particularly inexpensive manner.

In one example, the second end surface 152a and the lateral surface 152b are in contact with the interior volume of the tank. As such, the medium (e.g., fluid) may contact the second end surface 152a and the lateral surface 152b. As such, the first end surface 151a is in face sharing contact with an ambient atmosphere. Said another way, the first end surface 151a may not contact the medium in the tank.

FIG. 7 shows an exemplary freezing process for the operating medium 200 in an inclined tank 100 with a maximally filled operating-medium volume 320 with an icing guide device 150 at three selected times t1-t3. Due to the inclination of the tank, the upper wall 120 is also inclined relative to the direction of gravity. At a first time t1, the operating medium 200 is still liquid, but cold air of the surroundings 400 passes into a region below the surface 210 of the operating medium 200 through the depression 151 of the icing guide device 150. If the operating medium 200 in the tank 100 freezes at the time t2, then an ice layer 201 is formed on the outer tank inner sides 111 of the outer tank 110 in the region of the operating-medium volume 320. Due to the icing guide device 150, the surface of the outer tank inner side 111 and thus of the outer tank inner side 112 is locally enlarged, with the result that ice formation is initiated there too. The icing is consequently influenced in such a way that an enclosure of liquid operating-medium volume 200 in the interior of a liquid bubble (such as light bubble 202 of FIG. 2) can be prevented. This is true even for a tank 100 installed in an inclined manner. Thus, up until the time of complete icing at time t3, space is available for the volume expansion of the ice layer 201. Despite the complete icing of the operating medium 200, it is thus possible for degradation to the tank 100 to be avoided. That is to say, icing within the tank 100 is directed in such a way that the liquid bubble is avoided and sufficient space within the tank 100 is available to avoid degradation as the liquid freezes.

FIGS. 8a and 8b show, in a front view and a side view, an exemplary freezing process for the operating medium 200 in a tank 100 with a maximally filled operating-medium volume 320 and an icing guide device 150 at three selected times t1-t3. At a first time t1, the operating medium 200 is still liquid, but the depression 151 is filled with a material having an insulating effect, that is to say an insulating material 153. Such an insulating effect in the icing guide device 150 can give rise to impurities which can arise in a motor vehicle during the operation of the tank 100, for example water, snow or sand 154 (cf. FIG. 9a). Due to the insulating material 153 of the icing guide device 150, no or little cold air from the surroundings 400 passes into a region below the surface 210 of the operating medium 200. Nevertheless, the immersion of the projection 152 in the operating medium 200, due to the displacement of the operating medium 200, prevents the operating medium 200 in the tank 100 from freezing in the region of the icing guide device 150 at time t2. Thus, although an ice layer 201 is formed on the outer tank inner sides 111 of the outer tank 110, the operating medium 200 which has not yet frozen has at all times an open access, not iced over, to the surface 210 and thus space for expanding. In particular, the region in which an ice volcano 220 (cf. FIG. 1) may have its maximum deflection remains completely free of ice for a long time. The icing is consequently influenced in such a way that an enclosure of liquid operating-medium volume 200 in the interior of a liquid bubble 202 can be prevented. Thus, up until shortly before complete icing at time t3, space is available for the volume expansion of the ice formation. Despite the icing, the tank 100 remains intact.

Such a successful result of an outer tank 110 is shown in FIGS. 9a-9d. The depression 151 of the icing guide device 150 is, as per FIG. 9a, filled with sand 154, which has an insulation effect under the influence of cold. A deformation 121 of the upper wall 120 may not occur or may occur at a magnitude that is inconsequential to the tank 100, even with complete freezing of the operating medium 200. As such, if the deformation 121 does occur, functionality of the tank 100 may not be affected. Measurements have shown that a tank 100 with a tank interior or an operating-medium volume 320 of 16 liters has for example a deformation 121 in the form of a bulging of the upper wall 120 amounting to only 0.14 millimeters. Preferably, as per FIG. 9b, the icing guide device 150 is to be arranged on the upper wall 120 of the outer tank 110 at the center with respect to a tank width 123 (indicated by way of example) and a tank depth 122 (indicated by way of example). Due to the successful limitation of the deformation 121, the upper wall 120 remains intact as per FIGS. 9c-9d, and the icing process has been withstood.

In the arrangement of FIGS. 9a-9d, the icing guide device 150 is arranged adjacent to a hose 902, a first outer tank feature 904, a second outer tank feature 906, and a mount feature 908. The icing guide device 150 and the mount feature 908 are arranged between the first outer tank feature 904 and the second outer mount feature 908. The icing guide device 150 is arranged between the hose 902 and the mount feature 908. In one example, the first outer tank feature 904 and the second outer tank feature 906 extend in a direction opposite to gravity whereas the icing guide feature 150 extends in a direction parallel to gravity of angled to gravity at an angle less than or greater than 90 degrees.

In this way, a reservoir tank comprises an ice guide device arranged therein. The technical effect of the ice guide device is to guide freezing/ice formation within the tank by providing additional thermal communication with an ambient atmosphere to the liquid. Additionally or alternatively, the ice guide device is configured to displace the liquid volume to certain areas to promote ice formation in areas with sufficient space to accommodate the ice formation. By doing this, the ice guide device may improve freezing conditions in the tank such that liquid stored in the tank may not crack or degrade the tank when it freezes.

FIGS. 1-9d show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

In another representation, a tank is suitable for accommodating fluid operating media of a motor vehicle, having an outer tank with an outer tank inner side and an outer tank outer side, wherein the outer tank encloses a tank interior, which tank interior is able to be subdivided into an operating-medium volume and a compensation volume, wherein an icing guide device is arranged on the outer tank, characterized in that the icing guide device is in the form of at least one depression, pointing into the tank interior, of the outer tank outer side.

In a first example, the tank further comprises where the icing guide device is in the form of at least one projection of the outer tank inner side.

In a second example, optionally including the first example, further includes where the tank comprises where the icing guide device is arranged entirely or partly in the region of the operating-medium volume.

In a third example, optionally including one or more of the previous examples, further includes where the tank comprises where the outer tank has an upper wall with respect to the vehicle vertical axis, and the icing guide device is arranged on the upper wall.

In a fourth example, optionally including one or more of the previous examples, further includes where the tank comprises where the at least one depression of the outer tank outer side is filled or is able to be filled with an insulating material.

In a fifth example, optionally including one or more of the previous examples, further includes where the tank comprises where the icing guide device is in the form of a pocket in the outer tank outer side that has a cylindrical, in particular circular-cylindrical, profile.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
a reservoir tank comprising a protrusion extending from an upper tank wall past a fill limit line, wherein the protrusion extends into a fluid in the reservoir tank and is filled with an insulating material.

2. The system of claim 1, wherein the protrusion comprises a first surface in contact with the fluid and a second surface in contact with an ambient atmosphere.

3. The system of claim 1, wherein the protrusion is arranged at a center of the reservoir tank.

4. The system of claim 1, wherein the protrusion and a plurality of passages extending to the reservoir tank are arranged on a same side of an outer shell feature.

5. The system of claim 4, wherein the outer shell feature protrudes in a direction opposite a direction of the protrusion.

6. The system of claim 1, wherein the upper tank wall is inclined relative to a direction of gravity.

7. The system of claim 1, wherein the upper tank wall is normal to a direction of gravity.

8. A fluid reservoir, comprising:
a tank comprising an outer shell; and
a protrusion extending from an upper wall of the outer shell into an interior volume of the tank, wherein the protrusion extends beyond a fill limit line of the interior volume, and wherein a volume of the protrusion in contact with ambient atmosphere is empty.

9. The fluid reservoir of claim 8, wherein the protrusion is arranged adjacent to a tank mount, wherein the protrusion and the tank mount are arranged between outer wall features of the outer shell.

10. The fluid reservoir of claim 9, wherein the outer wall features extend in a direction opposite a direction of the protrusion.

11. The fluid reservoir of claim 9, wherein the outer shell is angled to a direction of gravity less than or greater than 90 degrees.

12. The fluid reservoir of claim 9, wherein the protrusion is angled less than or greater than 90 degrees relative to gravity.

13. The fluid reservoir of claim 9, wherein the tank is a selective catalytic reduction tank configured to store urea.

14. The fluid reservoir of claim 9, wherein a volume of the protrusion in contact with an ambient atmosphere is filled with an insulating material.

15. The fluid reservoir of claim 9, wherein a majority of the protrusion extends beyond the fill limit line.

16. A fluid tank, comprising:
a protrusion extending from an upper wall of the fluid tank toward a center of an interior volume of the fluid tank, past a fill line and into a fluid, wherein the protrusion is hollow and comprises a first surface in contact with an environment of the interior volume and a second surface directly in contact with an ambient atmosphere.

17. The fluid tank of claim 16, wherein the protrusion comprises a cylindrical shape.

18. The fluid tank of claim 16, wherein the protrusion extends in a direction parallel to gravity.

* * * * *